United States Patent
Eluru et al.

(10) Patent No.: US 10,544,356 B2
(45) Date of Patent: Jan. 28, 2020

(54) INHIBITING CORROSION IN A DOWNHOLE ENVIRONMENT

(71) Applicant: HALLIBURTON ENERGY SERVICES, INC., Houston, TX (US)

(72) Inventors: Sairam Eluru, Pune (IN); Umesh Nehete, Pune (IN); Rajender Salla, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/329,571

(22) PCT Filed: Oct. 17, 2016

(86) PCT No.: PCT/US2016/057345
§ 371 (c)(1),
(2) Date: Feb. 28, 2019

(87) PCT Pub. No.: WO2018/074997
PCT Pub. Date: Apr. 26, 2018

(65) Prior Publication Data
US 2019/0218452 A1 Jul. 18, 2019

(51) Int. Cl.
*E21B 41/02* (2006.01)
*C09K 8/74* (2006.01)
(Continued)

(52) U.S. Cl.
CPC ............ *C09K 8/74* (2013.01); *C09K 8/54* (2013.01); *E21B 37/06* (2013.01); *E21B 41/02* (2013.01); *C09K 2208/32* (2013.01); *E21B 43/26* (2013.01)

(58) Field of Classification Search
None
See application file for complete search history.

(56) References Cited

U.S. PATENT DOCUMENTS 3,773,465 A    11/1973  Keeney et al.
3,926,258 A *  12/1975  Hessert ............... C09K 8/06
                                                        166/294
(Continued)

FOREIGN PATENT DOCUMENTS

WO    2007007025 A1    1/2007
WO    2008077005 A1    6/2008
(Continued)

OTHER PUBLICATIONS

International Search Report and Written Opinion dated Jul. 17, 2017 for international patent application No. PCT/US2016/057345, filed on Oct. 17, 2016.
(Continued)

*Primary Examiner* — Andrew Sue-Ako
(74) *Attorney, Agent, or Firm* — Chamberlain Hrdlicka

(57) ABSTRACT

A method and system for inhibiting corrosion of a surface in a well including introducing a composition into the well, the composition comprising an acidic medium and Dihydrogen (ethyl) [4-[4-[ethyl(3-sulphonatobenzyl)amino] (4-hydroxy-2-sulphonatobenzhydrylidene]cyclohexa-2,5-dien-1-ylidene](3-sulphonatobenzyl)ammonium), contacting the metal surface with the composition, and inhibiting corrosion of the metal surface with the Dihydrogen (ethyl)[4-[4-[ethyl (3-sulphonatobenzyl)amino](4-hydroxy-2-sulphonatobenz-hydrylidene]cyclohexa-2,5-dien-1-ylidene] (3-sulphonato-benzyl)ammonium).

7 Claims, 1 Drawing Sheet

(51) Int. Cl.
*C09K 8/54* (2006.01)
*E21B 37/06* (2006.01)
*E21B 43/26* (2006.01)

(56) References Cited

U.S. PATENT DOCUMENTS

| | | | |
|---|---|---|---|
| 4,871,024 A | 10/1989 | Cizek | |
| 4,997,040 A | 3/1991 | Cizek | |
| 7,842,127 B2 | 11/2010 | Malwitz | |
| 2004/0115140 A1* | 6/2004 | Joziak | A61K 8/21 |
| | | | 424/52 |
| 2006/0264335 A1 | 11/2006 | Penna et al. | |
| 2016/0051833 A1 | 2/2016 | Patel et al. | |
| 2018/0371308 A1* | 12/2018 | Eluru | C09K 8/035 |

FOREIGN PATENT DOCUMENTS

| | | |
|---|---|---|
| WO | 2010078633 A1 | 7/2010 |
| WO | 2011053585 A2 | 5/2011 |

OTHER PUBLICATIONS

J. Iran. Chem. Soc. vol. 6, No. 2, Jun. 2009, 353-363, Cararnine and Fast green as corrosion inhibitors for mild steel in Hydrochloric acid solution.

Materials and Corrosion, vol. 54, Issue 4, pp. 222-228, Apr. 2003, Copper corrosion inhibition by fast green, fuchsin acid and basic compounds in citric acid solution.

* cited by examiner

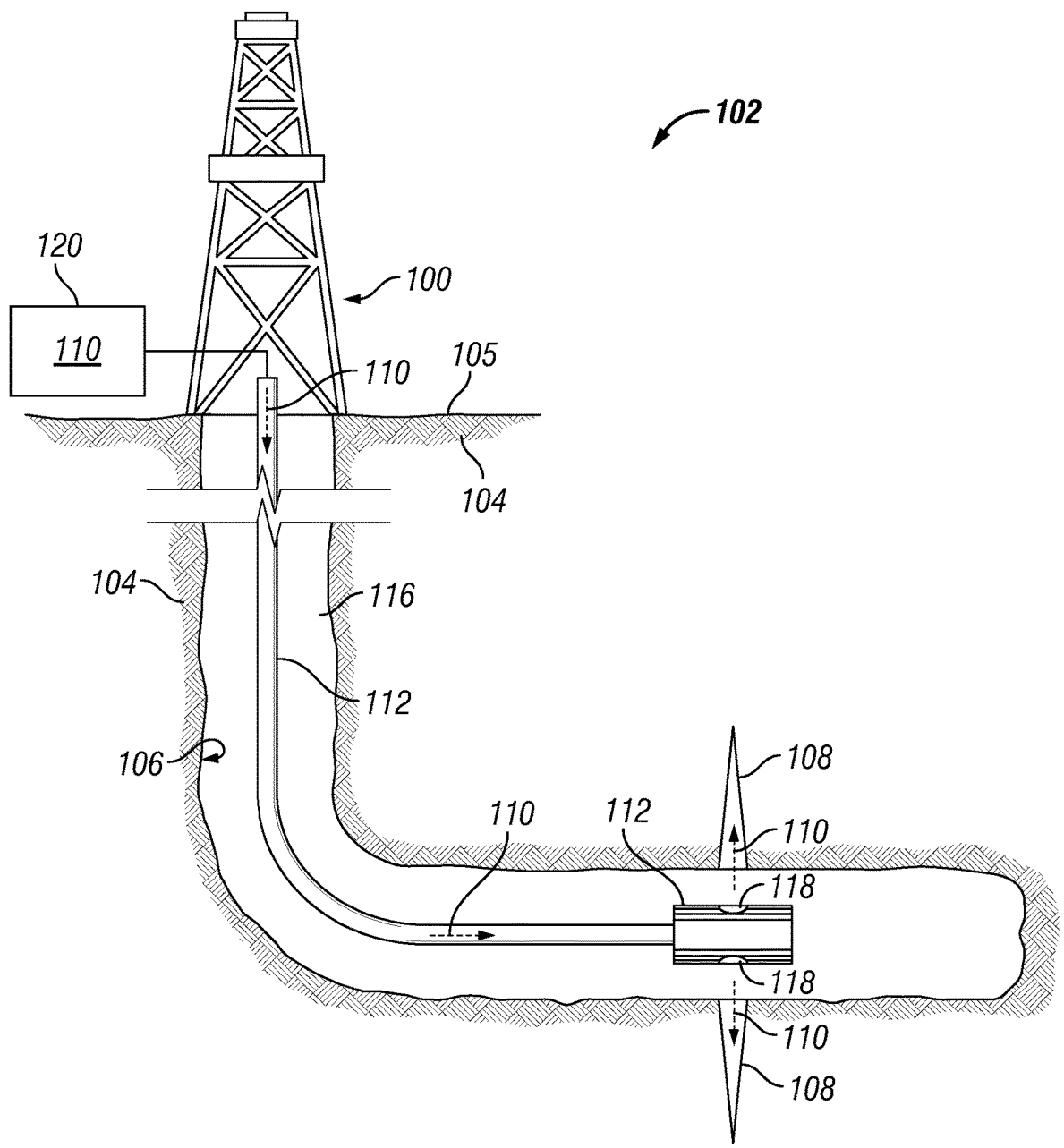

INHIBITING CORROSION IN A DOWNHOLE ENVIRONMENT

BACKGROUND

This section is intended to provide relevant contextual information to facilitate a better understanding of the various aspects of the described embodiments. Accordingly, it should be understood that these statements are to be read in this light and not as admissions of prior art.

Acidizing and fracturing procedures are commonly carried out in subterranean well formations for a number of purposes including, but not limited to, the recovery of hydrocarbons from the formation. Such procedures often use acidic fluids, for example, hydrochloric acid (HCl) to stimulate hydrocarbon production. However, the use of acidic fluids can initiate corrosion of metal equipment, tools, and other devices located in a wellbore. If the concentration of the acidic fluid is high and/or elevated temperatures are encountered in deeper formations, the corrosive effects of the acidic fluid may be exacerbated. Corrosion inhibitors are often introduced into the acidic fluid to inhibit or prevent corrosion.

BRIEF DESCRIPTION OF THE DRAWINGS

For a detailed description of the embodiments of the invention, reference will now be made to the accompanying drawings in which:

FIG. 1 is a schematic view of an example oilfield environment, according to one or more embodiments.

DETAILED DESCRIPTION

Referring now to FIG. 1, a schematic view of an example well 100, located onshore or offshore, in an oilfield environment 102 is shown. It should be understood that the well 100 and the oilfield environment 102 of FIG. 1 are merely one embodiment of the principles of this disclosure, and a variety of other embodiments are possible. Therefore, the scope of this disclosure is not limited at all to the details of the well 100 described herein and/or depicted in the drawings.

The oilfield environment 102 includes a formation 104 composed of porous and permeable rock that contains hydrocarbons. The formation 104 may be located in the range of a few hundred feet to a few tens of thousands of feet below a ground surface 105. A wellbore 106 is drilled to penetrate the formation 104 and to provide passage of the hydrocarbons recovered from the rock. The wellbore 106 of FIG. 1 is formed at any suitable angle to reach the hydrocarbon-rich portion of the formation 104.

Hydrocarbons readily flow out of the formation 104 and into the wellbore 106 when the permeability of the rocks is substantial. In some cases, the formation 104 may have low permeability, and the flow of hydrocarbons from the formation 104 is hampered. To further stimulate and to recover the hydrocarbons, a fracturing technique is initiated to break, fracture, or induce dilation of existing or new fractures in the rocks. One type of fracturing technique includes injecting a pressurized liquid, such as a treating fluid 110, into the formation 104. In some examples, the treating fluid 110 can be injected into the wellbore 106 via a jetting tool 112, or by other suitable delivery methods. The treating fluid 110 flows through the holes 118 of the jetting tool 112 and into the wellbore 106 with a pressure force sufficient to crack the formation 104 and thus, create or further widen fractures 108 in the rocks. The fractures 108 create a pathway for the hydrocarbons to flow from the formation 104 and into the wellbore 106. In other examples, the treating fluid 110 can be injected at a particular pressure into an annulus area 116 of the wellbore 106 to flow into the fractures 108 and/or create new fractures 108. The treating fluid 110 can be stored in a source vessel 120, such as a storage tank or a pipeline, in fluid communication with one or more types of injection equipment 121, for example, tubing, pipes, pumps, compressors, of any device capable of pumping wellbore fluids into the wellbore 106. The injection equipment 121 supplies a feed pressure to flow the treating fluid 110 into the wellbore 106 or the formation 104 to contact a metal surface or any surface or environment that is susceptible to corrosive attacks. As shown in FIG. 1, the injection equipment 121 is located at the ground surface 105, or can be disposed within the wellbore 106, for example, within a casing of the wellbore 106.

The composition of the treating fluid 110 may include an acidic medium to further stimulate the production of the hydrocarbons from the formation 104. The acidic medium flows into the fractures 108 and reacts with the formation 104 to create flow channels that remain open during hydrocarbon production and thus increase the permeability and the size of pore spaces in the rocks. The acidic medium typically includes, for example, 15% to 28% of an acid (e.g., hydrogen sulfide ($H_2S$), sulfuric acid ($H_2SO_4$), acetic acid ($C_2H_4O_2$), and so forth). Other acids and acidic solutions can be introduced into the wellbore 106 for damage removal, treatment, to inhibit or eliminate paraffin precipitation, and the like. However, while useful in initiating or widening the fractures 108, the acidic medium often corrodes the metal surfaces located in the wellbore 106.

Corrosion refers to a chemical reaction (e.g., oxidation reaction) between the surface of a metal and the acidic medium. The acidic medium attacks, i.e., dissolves, the metal surface to cause deterioration or change in the properties or morphology of the surface. Other corrosive mediums found in the wellbore 106 may include water, oxygen, chloride, bromide, and carbon dioxide, among others. The type of metals subjected to the corrosive mediums include, but are not limited to, steel, copper, chrome, iron, and nickel, and their alloys, among other metals capable of withstanding environmental, physical, and other conditions in the wellbore 106. As shown in FIG. 1, one example of a metal surface in the oilfield environment 102 includes the jetting tool 112. Other equipment, tools, and devices susceptible to corrosive mediums can include pumps, piping, tubing, heat exchangers, reactors, and other downhole equipment composed of metal and metal alloys.

To combat the corrosive effects of the acidic medium, the treating fluid 110 includes a corrosion inhibitor. As described herein, a corrosion inhibitor can be physically and/or chemically adsorbed on the surface of the metal to form a protective film between the metal surface and the acidic medium. The protective film acts as a barrier to shield the metal surface from attack by the acidic medium, thus, preventing or reducing the rate of corrosion. Further, the corrosion inhibitor increases or decreases anodic and cathodic reactions and decreases diffusion rates and electric resistance at metal surfaces in an effort to reduce the rate of corrosion. However, typical corrosion inhibitors, e.g., organic or inorganic inhibitors, injected into the wellbore 106 are made of toxic and/or non-biodegradable materials that are often deemed hazardous to the environment.

Green corrosion inhibitors, on the other hand, present a more suitable option due to a biodegradable nature and compositions that lacks heavy metals and other non-toxic compounds. The green corrosion inhibitors can include food grade materials such as phosphates, organic and amino acids, food dyes, and the like and/or naturally-grown plants, fruits, trees, and their extracts, for example, garlic, castor seeds, onion juice, and natural honey, among others. In the presence of the acidic medium, and in low temperature environments, the green corrosion inhibitors are known to inhibit corrosion. However, green corrosion inhibitors often fail to reduce corrosive effects when subjected to elevated temperatures, for example, in a downhole well environment. However, green corrosion inhibitors such as Dihydrogen (ethyl)[4-[4-[ethyl(3-sulphonatobenzyl) amino](4-hydroxy-2-sulphonatobenzhydrylidene]cyclohexa-2,5-dien-1-ylidene](3-sulphonatobenzyl)ammonium), which is also known as Fast Green FCF, food green 3, FD&C Green No. 3, Green 1724, Solid Green FCF, and C.I. 42053 and/or a fruit from a *Balanites aegyptiaca* tree have proven to be effective in reducing the rate of corrosion when subjected to elevated temperatures. As described herein, the green corrosion inhibitors will be referred to Fast Green FCF and fruit from a *Balanites aegyptiaca* tree. The Fast Green FCF and the fruit from the *Balanites aegyptiaca* tree can inhibit corrosion in high temperature environments, for example, at least about 77 Fahrenheit (° F.) (93.3 Celsius (° C.)) up to about 500° F. (260° C.). In the embodiments, the Fast Green FCF and the fruit from the *Balanites aegyptiaca* tree are components of the treating fluid 110, as described herein, or can be injected into the wellbore 106 alone to inhibit corrosion.

The acidic medium of the treating fluid 110 can include any inorganic acid, organic acid, or a mixture thereof. For example, the acidic medium can be selected from hydrochloric acid (HCl), formic acid, acetic acid, citric acid, 3-hydroxypropionic acid, hydrofluoric acid, glycolic acid, sulfamic acid, carbonic acid, precurors of any of the listed acids, any mixtures of the listed acids in various proportions, and other types of generally known treatment acids. The acidic medium makes up about 0.01 wt % to about 0.07 wt % of the treating fluid composition. In some cases, the acidic medium may be in the presence of an aqueous fluid that does not adversely react with the acidic medium and acts as a base for the acidic medium. The aqueous fluid can include, for example, fresh water, brine, salt-containing water solutions such as sodium chloride solutions, potassium chloride solutions or ammonium chloride solutions, brackish water or the like. The aqueous fluid can make up about 98% weight (wt) % to about 99.2 wt % of the treatment fluid 110.

In the embodiments, the concentration of the Fast Green FCF in the treating fluid 110 is about 0.01 weight (wt) % to about 20 wt %. Fast Green FCF is a synthetic compound containing triarylmethane and is often found in solid powder form and is used to dye food, detect proteins as a stain, and is used in various applications including highlighters, paints, detergents, and the like. The molecules of the Fast Green FCF include aromatic rings and electro-active nitrogen (N), oxygen (O), and sulfur (S) molecules that favor adsorption to surfaces, for example, a metal surface. In particular, the molecules of the Fast Green FCF include a large and flat structure that adsorbs, or binds, to the metal to form a protective layer that physically blocks the surface from attack by the acidic medium or an attack by other corrosive mediums found in the wellbore 106.

The chemical structure of Fast Green FCF includes:

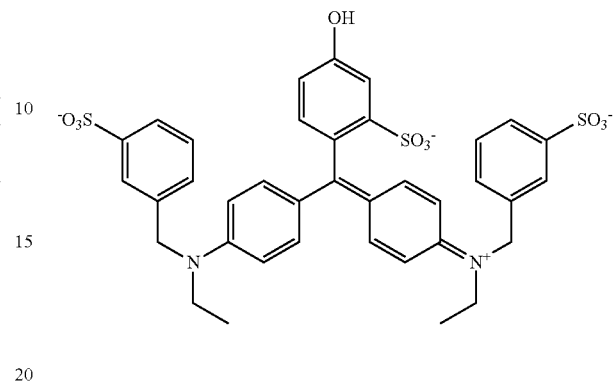

with a chemical formula of $C_{37}H_{34}N_2Na_2O_{10}S_3$. The aromatic rings, the N, O, and S molecules of the Fast Green FCF are found to have a high basicity and electron density and thus, are the active centers for the adsorption process on the metal surface. The adsorption process is based on the electrostatic interaction between the charged centers of the aromatic rings, N, O, and S molecules of the Fast Green FCF and the charged metal surface.

In the embodiments, the treating fluid 110 can also include the fruit from a *Balanites aegyptiaca* tree as a corrosion inhibitor. The concentration of the fruit in the treating fluid is about 0.001 weight wt % to about 20 wt %. The fruit from the *Balanites aegyptiaca* tree includes several common names including, but not limited to, Hinganbet, Hingot, Hingol, and Hingan. The yellow, single-seeded fruit from the *Balanites aegyptiaca* tree contains about 1.2% to about 1.5% protein, about 35 to about 37% sugars, about 15% organic acids, and other constituents. The other constituents, for example, include charged molecules 3-rutinoside (1), 3-rhamnogalactoside (2), and diosgenin (3) as shown below:

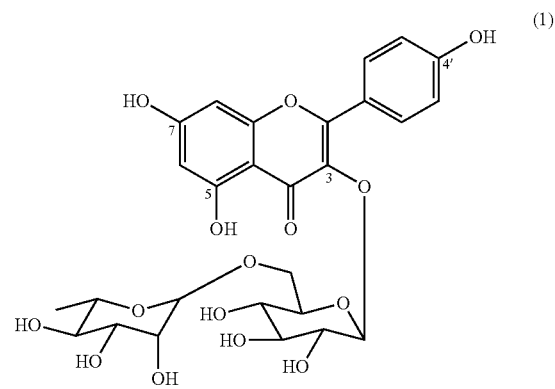
(1)

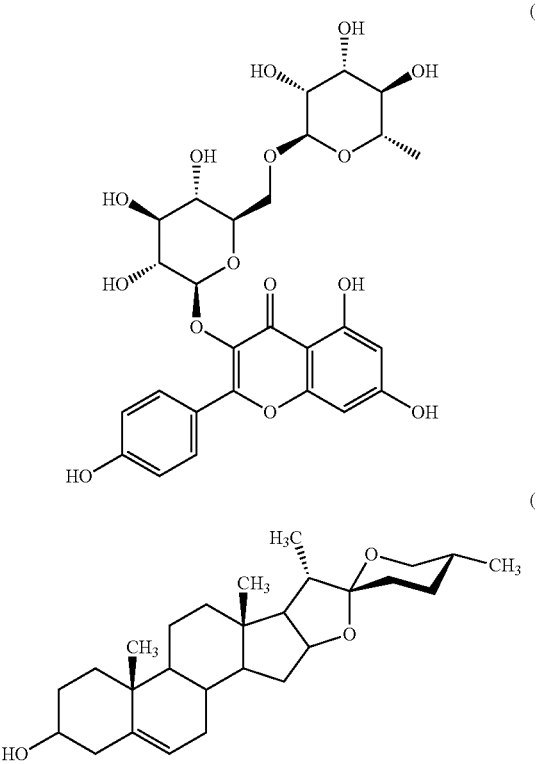

(2)

(3)

The fruit from the *Balanites aegyptiaca* tree also contains a mixture of 22R and 22S epimers of 26-(O-β-D-glucopyranosyl)-3-β-[4-O-(β-D-glucopyranosyl)-2-O-(α-L-rhamnopyranosyl)-β-D-glucopyranosyloxy]-22,26-dihydroxyfurost-5-ene, which can either adsorb or associate with other components included with the fruit to enhance inhibition efficiency.

The charged molecules of the fruit adsorb to the metal surface similar to the adsorption process of the Fast Green FCF, as previously described. The adsorption exhibited by the fruit is based on the electrostatic interaction between the charged molecules of the fruit, i.e., the 3-rutinoside, the 3-rhamnogalactoside, and the diosgenin, and the charged molecules of the metal. The electrostatic interaction results in a dipole-dipole interaction that includes an attraction between the fruit molecules and the metal molecules. In particular, the aromatic rings, the OH groups, and the Pi (π) electrons of the the 3-rutinoside, the 3-rhamnogalactoside, and the diosgenin form dipole-dipole bonds with the metal to block metal anodes and thus, reduce or prevent dissolution of the metal surface.

The treating fluid 110 of the embodiments can include the Fast Green FCF, the fruit from the *Balanites aegyptiaca* tree, or a combination of both the Fast Green FCF and the fruit as a corrosion inhibitor. The treating fluid 110 can be introduced into the wellbore 106 via the injection equipment 121 to contact a metal surface, for example, the jetting tool 112. In one or more embodiments, the Fast Green FCF and the fruit from the *Balanites aegyptiaca* tree can be individually injected into the wellbore 106 via the injection equipment 121. In other examples, a mixer can blend the Fast Green FCF and the fruit from the *Balanites aegyptiaca* tree before the treating fluid 110 is introduced into the wellbore 106.

As will be further explained, the Fast Green FCF and the fruit from the *Balanites aegyptiaca* tree are effective at inhibiting the rate of corrosion, i.e., greater than a 98% corrosion inhibition rate, in environments where temperatures can range from about 77° F. and to about 500° F., for example, in a downhole well environment.

In some examples, a corrosion inhibiting intensifier(s) is included in the treating fluid 110 to extend or improve the performance of the corrosion inhibitor. The intensifier can include potassium iodine, cuprous iodide, cuprous chloride, quaternary ammonium compounds, antimony compounds such as antimony oxides, antimony halides, antimony tartrate, antimony citrate, alkali metal salts of antimony tartrate and antimony citrate, alkali metal salts of pyroantimonate and antimony adducts of ethylene glycol, bismuth compounds such as bismuth oxides, bismuth halides, bismuth tartrate, bismuth citrate, alkali metal salts of bismuth tartrate and bismuth citrate, formic acid, among others, and any combination of the foregoing in various proportions. In particular, the composition of the treating fluid 110 can include commercially available corrosion inhibitor intensifiers such as formic acid (HII-124F™), potassium iodide (HII-124B™) and/or copper chloride (HII-124C™), marketed by Halliburton Energy Services, Inc. When included, the concentration of the intensifier is generally present in an amount in the range of about 0.01 wt % to about 10 wt %. Preferably, the corrosion inhibitor intensifier is present in an amount in the range of about 0.01 wt % to about 0.7 wt % of the treating fluid 110.

The treating fluid 110 can include additives that are introduced into the wellbore 106 along with the corrosion inhibitors and the corrosion inhibiting intensifiers. The additives may be added when the corrosion inhibitor and/or acidic medium is subjected to higher temperatures and/or more aggressive acidic environments so that the effectiveness of the corrosion inhibitor is reduced. The additives can include pH control additives, surfactants, viscoelastic surfactants, breakers, fluid loss control additives, scale inhibitors, asphaltene inhibitors, paraffin inhibitors, salts, foamers, defoamers, emulsifiers, demulsifiers, metal control agents, solvents, mutual solvents, particulate diverters, dispersing agent, an anti-sludging agents, scavengers, carbon dioxide, nitrogen, other biopolymers, synthetic polymers, friction reducers, any mixtures of the foregoing in any proportion, or the like. Further, the additives can include foamed, gelled, and emulsified fluids, synthetic gelling agents, natural gelling agents, surfactant gelling agents, and crosslinkers.

Various methods including, but not limited to, mass loss measurements, polarization measurements, and impedance measurements can be used to determine the effectiveness of the Fast Green FCF and the fruit from the *Balanites aegyptiaca* tree as corrosion inhibitors. For clarity purposes in the embodiments, mass loss measurements were taken to determine the corrosion inhibition rates of the Fast Green FCF and the fruit.

The mass loss measurements include, with respect to the total surface area of a metal, the difference between an initial weight of the metal before immersion in the treating fluid 110 and a final weight of the metal after immersion. As described herein, the weight loss experienced by the metal, i.e., the amount of metal lost to corrosion, can be expressed in pounds per square feet (lbs/ft$^2$) or any other unit of measure. The amount of metal lost to corrosion determines the performance of the corrosion inhibitors when subjected to various temperatures found in a downhole environment.

The following examples are given to more fully describe the effectiveness of both the Fast Green FCF and the fruit from the *Balanites aegyptiaca* tree when used as corrosion inhibitors in the treating fluid 110. The examples are provided for purposes of illustration and should not be construed as limitations.

Example 1

Metal test coupons, such as standard L-80 steel test coupons, were used to determine the corrosion inhibition rates of the Fast Green FCF. Three (3) individual test coupons were immersed in three (3) different treating fluid compositions, each measuring one (1) liter (l), at varying temperatures and at a pressure of about 100 pound/square inch (lbs/in$^2$) or psi. It should be understood that the volume of the treating fluid compositions, the volume of acidic medium, the amount of corrosion inhibitor, and/or the amount of intensifier, as described herein, are for illustrative purposes and may vary depending on various factors, for example, the type of metals subjected to downhole conditions.

The preferable acidic medium is HCl or mixtures thereof. In each of the three compositions, 0.6 grams (g) (0.001323 pounds (lbs)) of Fast Green FCF was used in the presence of varying concentrations of HCl. One test coupon was immersed in each of the 3 treating fluid compositions for 4 hours at different temperatures to determine the effectiveness of Fast Green FCF, as indicated in Table 1. When subjected to high application temperatures, i.e., about 200° F. to about 250° F., such as in a downhole environment, the Fast Green FCF exhibited thermal stability (i.e., the ability to resist decomposition at high temperatures) and reduced the corrosion rate of the test coupons in the present of HCl.

Accordingly, the test coupon experienced a corrosion loss of about 0.0497 lb/ft$^2$ (2.04 Pascal (Pa)) and a corrosion inhibition rate of about 98.39%.

The third treating fluid composition, including 15% HCl, 0.6 g Fast Green FCF, and 0.7 g of a corrosion-inhibiting intensifier potassium iodide (HII-124B™), was subjected to a temperature of about 250° F. The initial weight of test coupon 3 before immersion into the treating fluid was 43.45 g (0.9568 lbs) and the weight after immersion was 42.76 g (0.09427 lbs). Accordingly, the test coupon experienced a corrosion loss of about 0.0489 lb/ft$^2$ (2.04 Pascal (Pa)) and a corrosion inhibition rate of about 98.41%.

For a corrosion inhibitor to be accepted for industry use, metal loss to corrosion must be less than the standard limit of 0.05 lbs/ft$^2$. At elevated temperatures similar to downhole conditions (i.e., about 77° F. to about 500° F.), the weight loss of the 3 test coupons when immersed in a treating fluid with Fast Green FCF is lower than the standard acceptable weight loss limit of 0.05 lbs/ft$^2$. Accordingly, Fast Green FCF is shown to be an acceptable corrosion inhibitor in the presence of elevated temperatures. In particular, Fast Green FCF exhibits corrosion inhibition properties, e.g., a corrosion inhibition rate greater than about 98.0%, to reduce the rate of metal corrosion in the presence of HCl.

The thermal stability of Fast Green FCF can be improved from 200° F. to about 250° F. by decreasing the concentration of HCl, for example, from 15% to 7.5% and/or adding the intensifier. As shown in the test results, the thermal stability of the Fast Green FCF increases to 250° F. even when the concentration of Fast Green FCF is unchanged (0.6 g) when in the presence of the intensifier.

TABLE 1

Comparison of Corrosion Loss for L-80 Steel Test Coupons using Fast Green FCF

| Treating Fluid Composition | Test Coupon | Temperature (F. °) | Weight of Corrosion Inhibitor Added (grams (g)) | Weight of Intensifier Added (g) | Initial Weight of Test Coupon (g) | Final Weight of Test Coupon (g) | Total About of Corrosion Loss for Test Coupon (pounds/feet (lb/ft$^2$)) |
|---|---|---|---|---|---|---|---|
| 15% HCl Fast Green FCF | L-80 - No. 1 | 200 | 0.6 | 0 | 43.2 | 42.6 | 0.0426 |
| 7.5% HCl Fast Green FCF Intensifier | L-80 - No. 2 | 250 | 0.6 | 0.0 | 43.4 | 42.7 | 0.0497 |
| 15% HCl Fast Green FCF Intensifier | L-80 -No. 3 | 250 | 0.6 | 0.7 | 43.45 | 42.76 | 0.0489 |

The first treating fluid composition, including 15% HCl and 0.6 g of Fast Green FCF, was subjected to a temperature of about 200° F. The initial weight of test coupon 1 before immersion into the treating fluid was 43.2 g (0.9523 lbs) and the weight after immersion was 42.6 g (0.09392 lbs). Accordingly, the test coupon experienced a corrosion loss of about 0.0426 lb/ft$^2$ (2.04 Pascal (Pa)) and a corrosion inhibition rate of about 98.61%.

The second treating fluid composition, including 7.5% HCl, 0.6 g Fast Green FCF, was subjected to a temperature of about 250° F. The initial weight of test coupon 2 before immersion into the treating fluid was 43.4 g (0.9568 lbs) and the weight after immersion was 42.7 g (0.09412 lbs).

Example 2

Individual P-110 steel test coupons where immersed in 3 different treating fluid compositions, each measuring 1 liter (l) and at pressure of about 1000 psi, to determine the effectiveness of the corrosion inhibitor Fast Green FCF. It should be understood that the volume of the treating fluid compositions, the volume of acidic medium, the amount of corrosion inhibitor, and/or the amount of intensifier, as described, are for illustrative purposes and may vary depending on various factors, for example, the materials subjected to downhole conditions.

Various amounts of Fast Green FCF were used in the presence of 15% HCl, the acidic medium. One P-110 test coupon was immersed in each of the three (3) compositions for 4 hours, where each composition was subjected to different temperatures. When subjected to high application temperatures, i.e., 200° F. and above, the Fast Green FCF exhibited thermal stability as shown in Table 2.

loss of about 0.053 lb/ft2 (2.538 Pa) and the Fast Green FCF exhibited a corrosion inhibition rate of about 98.20%. Although the third treating fluid composition is not lower than the standard acceptable weight loss limit of 0.05 lbs/ft$^2$,

TABLE 2

Comparison of Corrosion Loss for P-110 Test Coupons using Fast Green FCF

| Treating Fluid Composition | Test Coupon | Temperature (F. °) | Weight of Corrosion Inhibitor Added (grams (g)) | Weight of Intensifier Added (grams (g)) | Initial Weight of Test Coupon (grams (g)) | Final Weight of Test Coupon (grams (g)) | Total About of Corrosion Loss for Test Coupon (lb/ft$^2$) |
|---|---|---|---|---|---|---|---|
| 15% HCl Fast Green FCF | P-110 - No. 1 | 200 | 1.0 | 0 | 44.3 | 43.8 | 0.03 |
| 15% HCl Fast Green FCF Intensifier | P-110- No. 2 | 230 | 1.4 | 0.7 | 44.6 | 43.9 | 0.042 |
| 15% HCl Fast Green FCF Intensifier | P-110- No. 3 | 250 | 2.0 | 0.7 | 44.6 | 43.8 | 0.053 |

The first treating fluid composition, including 15% HCl and 1.0 g of Fast Green FCF, was subjected to a temperature of about 200° F. The initial weight of test coupon 1 before immersion into the treating fluid was 44.3 g (0.9766 lbs) and the weight after immersion was 43.8 g (0.09656 lbs). Accordingly, the test coupon experienced a corrosion loss of about 0.03 lb/ft$^2$ (1.436 Pa) and a corrosion inhibition rate of about 980.87% at a temperature of 200° F.

The second treating fluid composition, including 15% HCl, 1.4 g Fast Green FCF, and 0.7 g of a corrosion-inhibiting intensifier potassium iodide (HII-124B™), was subjected to a temperature of about 230° F. The initial weight of test coupon 2 before immersion into the treating fluid was 44.6 g (0.9833 lbs) and the weight after immersion was 43.9 g (0.09678 lbs) so that the test coupon experienced a corrosion loss of about 0.042 lb/ft2 (2.011 Pa). Accordingly, the thermal stability of Fast Green FCF was improved from 200° F. to 230° F. in the presence of 15% HCl by increasing the amount of Fast Green FCF used to from about 1.0 g to about 1.4 g, in addition to adding the intensifier. Further, the Fast Green FCF exhibited a corrosion inhibition rate of about 98.43% in the presence of increasing temperatures.

The third treating fluid composition, including 15% HCl, 2.0 g Fast Green FCF, and 0.7 g of a corrosion-inhibiting intensifier potassium iodide (HII-124B™), was subjected to a temperature of about at 250° F. The initial weight of test coupon 3 before immersion into the treating fluid was 44.6 g (0.9833 lbs) and the weight after immersion was 43.8 g (0.09656 lbs) so that the test coupon experienced a corrosion the use of additional intensifiers and/or other additives may lower the amount of metal lost to corrosion even at higher temperatures.

In all cases, acceptable inhibition of corrosion was observed at elevated temperatures similar to downhole conditions (i.e. about 200° F. to about 500° F.) Specifically, the weight loss of the P-110 metal test coupons due to corrosion when immersed in the Fast Green FCF exhibited a corrosion inhibition rate greater than about 98.0% in the presence of the acidic medium, HCl. When combined with an intensifier, the Fast Green FCF exhibited improved thermal stability in the presence of increased temperatures, e.g., at 230° F. and 250° F.

Example 3

Standard P-110 steel test coupons were used to determine the amount of metal lost to corrosion in a treating fluid including a fruit of a *Balanites aegyptiaca* tree as a corrosion inhibitor. Two (2) individual test coupons were immersed in two (2) different treating fluid compositions of 1 liter (l) with a 15% HCl acid composition at a temperature of about 200° F. for a duration of 5 hours. Specifically, one coupon was immersed in a 15% HCl acid composition that did not include the fruit and another coupon was immersed in a 15% HCl acid composition that included the fruit as a corrosion inhibitor. It should be understood that the volume of the compositions, the volume of acidic medium, the amount of corrosion inhibitor, and/or the amount of intensifier, as described herein, are for illustrative purposes and may vary depending on various factors, for example, the type of metals subjected to downhole conditions.

TABLE 3

Comparison of Corrosion Loss for P-110 Coupons using a Fruit of a *Balanites Aegyptiaca* Tree

| Treating Fluid Composition | Test Coupon | Temperature (F. °) | Initial Weight of Test Coupon (g) | Final Weight of Test Coupon (g) | Total Weight Loss (%) | Total About of Corrosion Loss for Test Coupon (lb/ft$^2$) |
|---|---|---|---|---|---|---|
| 15% HCl | P-110 - No. 1 | 200 | 39.8227 | 34.3504 | 13.74 | 0.3880 |
| 15% HCl Hinganbet Fruit | P-110 - No. 2 | 200 | 37.8162 | 37.3084 | 1.34 | 0.0360 |

The first treating fluid composition included 15% HCl without a corrosion inhibitor. The initial weight of test coupon 1 before immersion into the treating fluid was 39.8227 g (0.0878 lbs) and the weight after immersion was 34.3504 g (0.0757 lbs) to exhibit a corrosion loss of about 0.3880 lb/ft$^2$ (18.5775 Pa) with a weight loss percent of about 13.74% and a corrosion inhibition rate of about 86.25%.

The second treating fluid composition included 15% HC and the fruit as a corrosion inhibitor. The initial weight of test coupon 2 before immersion into the treating fluid was 37.8162 g (0.0833 lbs) and the weight after immersion was 37.3084 g (0.0823 lbs) to exhibit a corrosion loss of about 0.0360 lb/ft$^2$ (1.7237 Pa) with a weight loss percent of about 1.34% and a corrosion inhibition rate of about 98.65%.

The fruit of the *Balanites aegyptiaca* tree exhibits acceptable corrosion inhibition properties by reducing the rate of corrosion of metal in the presence of HCl. In particular, the treating fluid composition that includes the fruit exhibited a 98.65% corrosion inhibition rate as opposed to the acid treatment without the fruit as a corrosion inhibitor, which exhibited a corrosion inhibition rate of 86.25%. Accordingly, even at elevated temperatures similar to downhole conditions (i.e. about 77° F. to about 500° F.), the weight loss of the P-110 metal coupon when subjected to a treating fluid that includes the fruit is lower than the standard acceptable weight loss limit of 0.05 lbs/ft$^2$.

Example 4

Standard P-110 steel test coupons were used to determine the amount of metal lost to corrosion in a treating fluid including a fruit of a *Balanites aegyptiaca* tree as a corrosion inhibitor. Two (2) individual test coupons were immersed in two (2) different treating fluid compositions under testing conditions of 250° F. and a pressure of 100 psi for a duration of 5 hours. Specifically, the coupon was immersed in a 15% HCl acid composition that did not include the fruit and another coupon was immersed in a 15% HCl acid composition that include the fruit as a corrosion inhibitor. It should be understood that the volume of the treating fluid compositions, the volume of acidic medium, the amount of corrosion inhibitor, and/or the amount of intensifier, as described herein, are for illustrative purposes and may vary depending on various factors, for example, the type of metals subjected to downhole conditions.

TABLE 4

Comparison of Corrosion Loss for P-110 Coupons using a Fruit of a *Balanites Aegyptiaca* Tree

| Treating Fluid Composition | Test Coupon | Temperature (F. °) | Initial Weight of Test Coupon (g) | Final Weight of Test Coupon (g) | Total Weight Loss (%) | Total About of Corrosion Loss for Test Coupon (lb/ft$^2$) |
|---|---|---|---|---|---|---|
| 15% HCl | P-110 - No. 1 | 250 | 39.8227 | 34.3504 | 13.74 | 0.3880 |
| 15% HCl Hinganbet Fruit | P-110 - No. 2 | 250 | 37.8234 | 37.0340 | 2.087 | 0.0560 |

The first treating fluid composition included 15% HCl without a corrosion inhibitor. The initial weight of test coupon 1 before immersion into the treating fluid was 39.8227 g (0.0878 lbs) and the weight after immersion was 34.3504 g (0.0757 lbs) to exhibit a corrosion loss of about 0.3880 lb/ft$^2$ (18.5775 Pa) with a weight loss percent of about 13.74% and a corrosion inhibition rate of about 86.25%.

The second treating fluid composition included 15% HC and the fruit as a corrosion inhibitor. The initial weight of test coupon 2 before immersion into the treating fluid was 37.8234 g (0.0834 lbs) and the weight after immersion was 37.0340 g (0.0816 lbs) exhibit a corrosion loss of about 0.056 lb/ft$^2$ (2.6812 Pa) with a weight loss percent of about 2.087% and a corrosion inhibition rate of about 97.91%.

The fruit of the *Balanites aegyptiaca* tree exhibits corrosion inhibition properties by reducing the rate of corrosion of metal in the presence of HCl. In particular, the treating fluid composition that includes the fruit exhibited an increased corrosion inhibition, i.e., 97.91% rate, as opposed to the acid treatment without the fruit as a corrosion inhibitor, which exhibited a corrosion inhibition rate of 86.25%. At elevated temperatures similar to downhole conditions (i.e. about 250° F. and), the weight loss of the P-110 metal coupon when subjected to a treating fluid that includes the fruit is not lower than the standard acceptable weight loss limit of 0.05 lbs/ft². However, in such cases, the use of additional intensifiers, such as the potassium iodide (HII-124B™), and/or other additives may extend the effectiveness of the fruit as a corrosion inhibitor at higher temperatures.

In addition, to the embodiments described above, many examples of specific combinations are within the scope of the disclosure, some of which are detailed below:

Example 1

A method of inhibiting corrosion of a surface in a well, comprising: introducing a composition into the well, the composition comprising an acidic medium and Dihydrogen (ethyl)[4-[4-[ethyl(3-sulphonatobenzyl)amino](4-hydroxy-2-sulphonatobenzhydrylidene]cyclohexa-2,5-dien-1-ylidene] (3-sulphonatobenzyl)ammonium), contacting the metal surface with the composition; and
inhibiting corrosion of the metal surface with the Dihydrogen (ethyl)[4-[4-[ethyl(3-sulphonatobenzyl)amino](4-hydroxy-2-sulphonatobenzhydrylidene]cyclohexa-2,5-dien-1-ylidene](3-sulphonatobenzyl)ammonium).

Example 2

The method of Example 1, wherein the composition further comprises a fruit from a *Balanites aegyptiaca* tree, the fruit to inhibit corrosion of the metal surface.

Example 3

The method of Example 1, wherein the composition comprises at least about 0.01 weight (wt) % to about 20 wt % of the Dihydrogen (ethyl)[4-[4-[ethyl(3-sulphonatobenzyl)amino](4-hydroxy-2-sulphonatobenzhydrylidene]cyclohexa-2,5-dien-1-ylidene](3-sulphonatobenzyl)ammonium).

Example 4

The method of Example 2, wherein the composition comprises at least about 0.001 wt % to about 10 wt % of the fruit.

Example 5

The method of Example 1, wherein the composition is introduced into the well or a subterranean formation traversed by the well using injection equipment.

Example 6

The method of Example 2, further comprising mixing a stream of the Dihydrogen (ethyl)[4-[4-[ethyl(3-sulphonatobenzyl)amino](4-hydroxy-2-sulphonatobenzhydrylidene]cyclohexa-2,5-dien-1-ylidene](3-sulphonatobenzyl)ammonium) and a stream of the fruit before introducing the composition into the well.

Example 7

The method of Example 1, further comprising intensifying the corrosion inhibition by introducing a corrosion inhibitor intensifier into the composition, the intensifier comprising at least one of formic acid, potassium iodide, and copper chloride.

Example 8

The method of Example 1, further intensifying the corrosion inhibition by introducing a corrosion inhibitor intensifier and an additive into the composition, the intensifier comprising at least one formic acid, potassium iodide, and copper chloride and the additive comprising pH control additives, surfactants, breakers, fluid loss control additives, scale inhibitors.

Example 9

A method of inhibiting corrosion of a surface in a well comprising, introducing a composition into the well comprising an acidic medium, Dihydrogen (ethyl)[4-[4-[ethyl (3-sulphonatobenzyl)amino](4-hydroxy-2-sulphonatobenzhydrylidene]cyclohexa-2,5-dien-1-ylidene](3-sulphonatobenzyl)ammonium) as a corrosion inhibitor and a fruit from a *Balanites aegyptiaca* tree as a corrosion inhibitor, contacting the metal surface with the composition, and inhibiting corrosion of the metal surface with the Dihydrogen (ethyl)[4-[4-[ethyl(3-sulphonatobenzyl)amino](4-hydroxy-2-sulphonatobenzhydrylidene]cyclohexa-2,5-dien-1-ylidene](3-sulphonatobenzyl)ammonium) and the fruit.

Example 10

The method of Example 9, further comprising mixing a stream of the Dihydrogen (ethyl)[4-[4-[ethyl(3-sulphonatobenzyl)amino](4-hydroxy-2-sulphonatobenzhydrylidene] cyclohexa-2,5-dien-1-ylidene](3-sulphonatobenzyl)ammonium) with a stream of the fruit before introducing the composition into the well.

Example 11

The method of Example 9, further comprising intensifying the corrosion inhibition by introducing a corrosion inhibitor intensifier into the composition, the intensifier comprising at least one of formic acid, potassium iodide, and copper chloride.

Example 12

The method of Example 9, further comprising intensifying the corrosion inhibition by introducing a corrosion inhibitor intensifier and an additive into the composition, the intensifier comprising at least one formic acid, potassium iodide, and copper chloride and the additive comprising pH control additives, surfactants, breakers, fluid loss control additives, scale inhibitors.

Example 13

The method of Example 9, wherein the composition is introduced into the well or a subterranean formation traversed by the well using injection equipment.

Example 14

A composition for inhibiting corrosion of a surface in a well, comprising, an acidic medium, and Dihydrogen (ethyl) [4-[4-[ethyl(3-sulphonatobenzy)amino](4-hydroxy-2-sulphonatobenzhydrylidene]cyclohexa-2,5-dien-1-ylidene](3-sulphonatobenzyl)ammonium) as a corrosion inhibitor.

Example 15

The composition of Example 14, wherein the Dihydrogen (ethyl)[4-[4-[ethyl(3-sulphonatobenzyl)amino](4-hydroxy- 2-sulphonatobenzhydrylidene]cyclohexa-2,5-dien-1-ylidene](3-sulphonatobenzyl)ammonium) comprises about 0.01 wt % to about 20 wt % of the composition.

Example 16

The composition of Example 14, further comprising a fruit from a *Balanites aegyptiaca* tree used as a corrosion inhibitor.

Example 17

The composition of Example 16, wherein the fruit comprises at least about 0.001 wt % to about 10 wt % of the composition.

Example 18

The composition of Example 14, wherein the acidic medium comprises hydrochloric acid, hydrofluoric acid, acetic acid, formic acid, citric acid, lactic acid, glycolic acid, sulfamic acid, or any combination thereof.

Example 19

The composition of Example 14, further comprising a corrosion inhibitor intensifier.

Example 20

The composition of Example 19, wherein the corrosion inhibitor intensifier comprises potassium iodide, amino trimethylene phosphonic acid, bis(hexa methylene triamine penta (methylene phosphonic acid), diethylene triamine penta(methylene phosphonic acid), ethylene diamine tetra (methylene phosphonic acid), hexamethylenediamine tetra (methylene phosphonic acid), 1-hydroxy ethylidene-1,1-diphosphonic acid, 2-hydroxyphosphonocarboxylic acid, 2-phosphonobutane-1,2,4-tricarboxylic acid, methylene diphosphonic acid, a derivative thereof, a salt thereof, or any combination thereof.

Example 21

The composition of Example 14, further comprising at least about 0.1 wt % to about 10 wt % of the corrosion inhibitor intensifier.

Example 22

The composition of Example 14, further comprising a corrosion inhibitor intensifier and an additive.

Example 23

The composition of Example 22, wherein the additive comprises surfactants, breakers, control agents, dispersants, foamers, defoamers, emulsifiers, demulsifiers, solvents, diverters, reducers, and any combination, thereof. It should be understood that for the various examples provided, the volume of the treating fluid composition, the volume of acidic medium, the amount of corrosion inhibitor, and other conditions, as described, are for illustrative purposes and may vary depending on various factors, for example, the materials subjected to downhole conditions.

This discussion is directed to various embodiments of the present disclosure. The drawing FIGURES are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A method of inhibiting corrosion of a surface in a well, comprising:
   introducing a composition into the well, the composition comprising an acidic medium and Dihydrogen (ethyl) [4-[4-[ethyl(3-sulphonatobenzyl)amino](4-hydroxy-2-sulphonatobenzhydrylidene]cyclohexa-2,5-dien-1-ylidene](3-sulphonatobenzyl)ammonium),
   wherein the composition comprises about 0.01 weight (wt) % to about 20 wt % of the Dihydrogen (ethyl)[4-[4-[ethyl(3-sulphonatobenzyl) amino](4-hydroxy-2-sulphonatobenzhydrylidene]cyclohexa-2,5-dien-1-ylidene](3-sulphonatobenzyl)ammonium);
   contacting the metal surface with the composition; and
   inhibiting corrosion of the metal surface with the Dihydrogen (ethyl)[4-[4-[ethyl(3-sulphonatobenzyl)amino](4-hydroxy-2-sulphonatobenzhydrylidene]cyclohexa-2,5-dien-1-ylidene](3-sulphonatobenzyl)ammonium).

2. The method of claim 1, wherein the composition further comprises a fruit from a *Balanites aegyptiaca* tree, the fruit to inhibit corrosion of the metal surface.

3. The method of claim 2, wherein the composition comprises about 0.001 wt % to about 10 wt % of the fruit.

4. The method of claim 2, further comprising mixing a stream of the Dihydrogen (ethyl)[4-[4-[ethyl(3-sulphonatobenzyl)amino](4-hydroxy-2-sulphonatobenzhydrylidene] cyclohexa-2,5-dien-1-ylidene](3-sulphonatobenzyl)ammonium) and a stream of the fruit before introducing the composition into the well.

5. The method of claim 1, wherein the composition is introduced into the well or a subterranean formation traversed by the well using injection equipment.

6. The method of claim 1, further comprising intensifying the corrosion inhibition by introducing a corrosion inhibitor intensifier into the composition, the intensifier comprising at least one of formic acid, potassium iodide, and copper chloride.

7. The method of claim 1, further comprising intensifying the corrosion inhibition by introducing a corrosion inhibitor intensifier and an additive into the composition, the intensifier comprising at least one of formic acid, potassium iodide, and copper chloride and the additive comprising at least one of pH control additives, surfactants, breakers, fluid loss control additives, and scale inhibitors.

\* \* \* \* \*